United States Patent
Kikkawa et al.

(10) Patent No.: US 7,160,527 B2
(45) Date of Patent: Jan. 9, 2007

(54) METHOD FOR TREATING AMONIA-CONTAINING EFFLUENT WATER

(75) Inventors: Hirofumi Kikkawa, Kure (JP); Yasuyoshi Kato, Kure (JP); Naomi Imada, Kure (JP); Takanori Nakamoto, Kure (JP); Shigehito Takamoto, Kure (JP)

(73) Assignee: Babcock-Hitachi-Kasushiki-Kaisha, Tokyo (JP)

( * ) Notice: Subject to any disclaimer, the term of this patent is extended or adjusted under 35 U.S.C. 154(b) by 198 days.

(21) Appl. No.: 10/343,754

(22) PCT Filed: Jan. 12, 2001

(86) PCT No.: PCT/JP01/00134

§ 371 (c)(1),
(2), (4) Date: Apr. 14, 2003

(87) PCT Pub. No.: WO02/12126

PCT Pub. Date: Feb. 14, 2002

(65) Prior Publication Data

US 2003/0161772 A1    Aug. 28, 2003

(30) Foreign Application Priority Data

Aug. 9, 2000   (JP) ............... 2000-240844
Aug. 31, 2000  (JP) ............... 2000-263072

(51) Int. Cl.
  *C01B 21/02*   (2006.01)
(52) U.S. Cl. ............... 423/237; 210/750; 423/351
(58) Field of Classification Search ............... 423/351, 423/237; 210/750
See application file for complete search history.

(56) References Cited

U.S. PATENT DOCUMENTS

| | | | | |
|---|---|---|---|---|
| 5,409,681 A | * | 4/1995 | Kato et al. | 423/239.1 |
| 5,783,160 A | * | 7/1998 | Kinugasa et al. | 423/237 |
| 6,479,026 B1 | * | 11/2002 | Iida et al. | 423/239.1 |
| 2002/0028171 A1 | * | 3/2002 | Goetsch et al. | 423/237 |

FOREIGN PATENT DOCUMENTS

JP   9-323088   * 12/1997

* cited by examiner

*Primary Examiner*—Wayne A. Langel
(74) *Attorney, Agent, or Firm*—Fay, Sharpe, Fagan, Minnich & McKee, LLP

(57) ABSTRACT

Disclosed are a method and an apparatus for treating an effluent containing ammonia in which method and apparatus $N_2O$ concentration in the gas at the outlet of a catalyst tower does not rise to a high level even when the $NH_3$ concentration in the effluent was reduced and the amount of hazardous substances formed is small; in the method and apparatus, an $NH_3$-containing effluent A and a carrier gas (steam C and combustion gas F) are contacted in stripping tower 7 to transfer the $NH_3$ from the $NH_3$-containing effluent to a gas phase, the gas containing the generated $NH_3$ is heated with pre-heater 19 and then contacted with catalyst layer 13 placed in catalyst tower 12 to decompose the $NH_3$ into nitrogen and water; and at that time, the oxygen concentration in the gas to be introduced into catalyst tower 12 and the $N_2O$ concentration in the gas discharged from catalyst tower 12 are determined by measuring instruments 21 and 22, respectively, and the oxygen concentration in the gas to be introduced into catalyst tower 12 is adjusted by adjusting valve 17 so that the $N_2O$ concentration becomes within a prescribed range.

4 Claims, 6 Drawing Sheets

METHOD FOR TREATING AMONIA-CONTAINING EFFLUENT WATER

TECHNICAL FIELD

The present invention relates to a method for treating an effluent (waste water) containing ammonia($NH_3$). More specifically, the present invention relates to a method and an apparatus for treating an $NH_3$-containing effluent by which method or apparatus the ammonia contained in the effluent discharged especially from a thermal power plant is efficiently converted into nitrogen ($N_2$) and water ($H_2O$) to make the ammonia harmless by a stripping method.

BACKGROUND ART

In recent years, there has been a growing concern to the conservation of global environment, and regulations against over-fertilization of sea areas have been enforced. Thus, the development of a new technology for removing nitrogen from an effluent has been sought. In answer to such request, the removal of the nitrogen contained in an effluent has been conducted from some time ago mainly by the following methods:

1) Biological denitrification method: Method in which an organic nitrogen contained in water is converted into an inorganic nitrogen to render the organic nitrogen harmless by using a bacterium.
2) Discontinuous $NH_3$ decomposition method with chlorine: Method in which $NH_3$ is oxidized to decompose by using sodium hypochlorite.
3) Ion exchange method: Method in which $NH_3$ is adsorbed on a zeolite through an ion exchange.
4) Ammonia stripping method: Method in which $NH_3$ is diffused or evaporated from an $NH_3$-containing effluent into the atmosphere by using air or steam.

When the BOD (biochemical oxygen demand) of an effluent is high, biological denitrification method 1) described above is used. On the other hand, in the case where an effluent in which most of nitrogen is in a form of ammonia nitrogen such as ammonia and ammonium ion is to be treated, for instance, when an effluent from a process in a chemical factory or an effluent once-subjected to a post-treatment is the object of the treatment, method 2), 3) or 4) is used.

However, the conventional methods described above have the problems as follows:

In the method 1), the size of a reaction bath necessary for the treatment becomes large since the rate of a biological reaction is slow, and thus a large space becomes necessary for placing the reaction bath. Besides, the method 1) raises the problem that excess amount of a sludge is produced. Method 2) causes the problem that a treatment of remaining chlorine becomes necessary and organic chlorine compounds are formed, since the addition of sodium hypochlorite in an amount more than that stoichio-metrically required is necessary for completely removing the ammonia. In the method 3), a secondary effluent containing ammonium ion at a high concentration is produced at the time of regenerating a used zeolite and thus a treatment of the secondary effluent becomes necessary. Further, the method 4) has the problem that an $NH_3$-containing gas is diffused or dissipated into the atmosphere after the $NH_3$ was transferred into a gas phase and causes a secondary pollution.

Among the methods described above, method 4) is advantageous compared with other methods since the treatment of an effluent is comparatively simple and the costs of equipments and operations are small. Accordingly, a combination in which the method 4) is performed in combination with another method which can be used for oxidizing to decompose the $NH_3$ contained at a high concentration in a gas separated from an effluent, by using a catalyst, to make the $NH_3$ contained in the effluent harmless as the result of the combination has been adopted even in current night-soil treatment facilities. However, in such a stripping and catalytically oxidizing process, it is necessary to install a catalyst tower for reducing NOx in addition to a catalyst tower for oxidizing $NH_3$ since a large quantity of NOx is generated at the time of the oxidation of $NH_3$. Further, according to the investigations by the present inventors, it has been found out anew that a large quantity of $N_2O$ is also produced in this process at the time of oxidizing the $NH_3$. Like $CO_2$, $N_2O$ is a substance contributing to the global warming. Accordingly, it is dangerous to the global environment that a large quantity of $N_2O$ is diffused into the atmosphere, in the same extent as $NH_3$ is diffused as it is. Thus, the diffusion of $N_2O$ is also undesirable.

As described above, treatments of $NH_3$-containing effluents in conventional technology have many problems and some of the treatments had a problem that they might become sources from which various secondary pollution substances are produced anew.

DISCLOSURE OF THE INVENTION

Subject of the present invention is to propose a method and an apparatus for treating an $NH_3$-containing effluent in which method and apparatus the amount of secondary pollution substances formed is reduced and the amount of utilities such as steam to be used can also be reduced.

In order to achieve the subject described above, the method and apparatus of the present invention are summarized as follows:

(1) A method for treating an ammonia-containing effluent comprising a stripping step in which the ammonia ($NH_3$) contained in the $NH_3$-containing effluent is transferred with a carrier gas from the effluent into a gas phase, a step for adding an oxygen-containing gas to the $NH_3$-containing gas produced at the stripping step, and an $NH_3$ decomposing step in which the oxygen-containing gas and the $NH_3$-containing gas are contacted with one or more kind of catalysts used for decomposing $NH_3$, at a prescribed temperature to decompose the $NH_3$ into nitrogen and water, the concentration of oxygen in the gas mixture introduced into the $NH_3$ decomposing step being adjusted.

(2) The method for treating an $NH_3$-containing effluent recited in paragraph (1) above wherein the method further comprises a step by which a part of the gas resulted in the $NH_3$ decomposing step is discharged outside the effluent treating system and the remaining part of the gas resulted in the decomposing step is recycled as a part of the carrier gas to be used in the stripping step.

(3) The method for treating an $NH_3$-containing effluent recited in paragraph (1) or (2) above wherein the concentration of oxygen in the gas mixture to be introduced into the $NH_3$ decomposing step is adjusted to a value within the range of 2 to 15%.

(4) The method for treating an $NH_3$-containing effluent recited in any one of paragraphs (1) to (3) above wherein the concentration of oxygen in the gas mixture to be introduced into the $NH_3$ decomposing step is adjusted so that the concentration of the $N_2O$ in the gas resulted in the $NH_3$ decomposing step becomes a value within a prescribed range.

(5) The method for treating an $NH_3$-containing effluent recited in any one of paragraphs (1) to (4) above wherein the catalyst used for decomposing $NH_3$ comprises a first component having an activity of reducing nitrogen oxides with $NH_3$ and a second component having an activity of forming nitrogen oxides (NOx) from $NH_3$.

(6) The method for treating an $NH_3$-containing effluent recited in any one of paragraphs (1) to (5) above wherein the catalyst used for decomposing $NH_3$ comprises, as a first component, an oxide of titanium (Ti) and an oxide of one or more elements selected from the group consisting of tungsten (W), vanadium (V), and molybdenum (Mo), and, as a second component, a silica, zeolite, and/or alumina having one or more noble metals selected from the group consisting of platinum (Pt), iridium (Ir), rhodium (Rh), and palladium (Pd) supported thereon.

(7) The method for treating an $NH_3$-containing effluent recited in any one of paragraphs (1) to (5) wherein the catalyst used for decomposing $NH_3$ is a zeolite or comprises, as a main component, a zeolite.

(8) The method for treating an $NH_3$-containing effluent recited in any one of paragraphs (1) to (4) above wherein the concentration of oxygen in the gas mixture to be introduced into the $NH_3$ decomposing step is adjusted so that the concentration of the $NH_3$ remaining in the gas resulted in the $NH_3$ decomposing step becomes a value within a prescribed range, while using the concentration of the $NH_3$ remaining in the gas resulted in the $NH_3$ decomposing step as an index, instead of the concentration of the $N_2O$ in the gas.

(9) The method for treating an $NH_3$-containing effluent recited in paragraph (8) above wherein the concentration of the $NH_3$ remaining in the gas resulted in the $NH_3$ decomposing step is higher than 50 ppm.

(10) The method for treating an $NH_3$-containing effluent recited in paragraph (8) or (9) above wherein the gas pressure in the effluent treating system is controlled to a prescribed value so that the amount of a part of the gas resulted in the $NH_3$ decomposing step and discharged outside the system becomes equal to the increase of the total amount of the gas including the amount of the oxygen-containing gas supplied into the system.

(11) The method for treating an $NH_3$-containing effluent recited in any one of paragraphs (8) to (10) above wherein the method further comprises a step for removing ammonia from a part of the gas resulted in the $NH_3$ decomposing step after the part of the gas was discharged outside the system.

(12) The method for treating an $NH_3$-containing effluent recited in any one of paragraphs (1) to (4) above wherein the step for decomposing the $NH_3$ into nitrogen and water by contacting the $NH_3$-containing gas with a catalyst is
a step in which two or more kind of catalysts each having a different power for oxidizing $NH_3$ are used, and the $NH_3$-containing gas is contacted first with a catalyst having a relatively low power for oxidizing $NH_3$ to decompose a part of the $NH_3$ into nitrogen and water and then with a catalyst having a relatively high power for oxidizing $NH_3$ to decompose the remaining part of the $NH_3$ into nitrogen and water, or
a step in which the $NH_3$-containing gas is contacted at the same time with two or more kind of the catalysts to decompose the $NH_3$ into nitrogen and water.

(13) The method for treating an $NH_3$-containing effluent recited in paragraph (12) above wherein two or more kind of the catalysts each having a different power for oxidizing $NH_3$ comprise, as a first component, an oxide of titanium (Ti) and an oxide of one or more elements selected from the group consisting of tungsten (W), vanadium (V), and molybdenum (Mo), and, as a second component, a silica, zeolite, and/or alumina having one or more noble metals selected from the group consisting of platinum (Pt), iridium (Ir), rhodium (Rh), and palladium (Pd) supported thereon, and the power for oxidizing $NH_3$ is adjusted by the ratio of the content of the first component to that of the second component.

(14) The method for treating an $NH_3$-containing effluent recited in paragraph (12) above wherein the catalyst having a relatively high power for oxidizing $NH_3$ is a zeolite.

(15) An apparatus for treating an $NH_3$-containing effluent comprising a stripping means for transferring the ammonia ($NH_3$) contained in the $NH_3$-containing effluent with a carrier gas from the effluent into a gas phase, a means for adding an oxygen-containing gas to the $NH_3$-containing gas produced in the stripping means, an $NH_3$ decomposing means by which the oxygen-containing gas and the $NH_3$-containing gas are contacted with one or more kind of catalysts used for decomposing $NH_3$, at a prescribed temperature to decompose the $NH_3$ into nitrogen and water, and a means for adjusting the concentration of oxygen in the gas mixture to be introduced into the $NH_3$ decomposing means.

(16) The apparatus for treating an $NH_3$-containing effluent recited in paragraph (15) above wherein the apparatus further comprises a means for determining the concentration of $N_2O$ or $NH_3$ in the gas discharged from the $NH_3$ decomposing means and controlling the concentration to a value within a prescribed range.

(17) The apparatus for treating an $NH_3$-containing effluent recited in paragraph (15) or (16) above wherein the catalyst used for decomposing $NH_3$ comprises, as a first component, an oxide of titanium (Ti) and an oxide of one or more elements selected from the group consisting of tungsten (W), vanadium (V), and molybdenum (Mo), and, as a second component, a silica, zeolite, and/or alumina having one or more noble metals selected from the group consisting of platinum (Pt), iridium (Ir), rhodium (Rh), and palladium (Pd) supported thereon.

(18) The apparatus for treating an $NH_3$-containing effluent recited in paragraph (15) or (16) above wherein the catalyst used for decomposing $NH_3$ is a zeolite or comprises, as a main component, a zeolite.

(19) The apparatus for treating an $NH_3$-containing effluent recited in paragraph (15) above wherein the catalyst used for decomposing $NH_3$ comprises
a catalyst in which one or more catalyst layers having a relatively low power for oxidizing $NH_3$ and one or more catalyst layers having a relatively high power for oxidizing $NH_3$ are arranged in series, or
a plate-like catalyst in which catalyst layers having a relatively low power for oxidizing $NH_3$ and catalyst layers having a relatively high power for oxidizing $NH_3$ are arranged alternately in the direction perpendicular to the direction of the gas flow with the surfaces of the layers being held in parallel to the gas flow direction.

As specific examples of catalysts comprising a first component having an activity of reducing nitrogen oxides with $NH_3$ and a second component having an activity of forming nitrogen oxides (NOx) from $NH_3$, catalysts comprising, as a first component, an oxide of titanium (Ti) and an oxide of one or more elements selected from the group consisting of tungsten (W), vanadium (V), and molybdenum (Mo), and, as a second component, a silica, zeolite, and/or alumina having one or more noble metals selected from the group consisting of platinum (Pt), iridium (Ir), rhodium (Rh), and palladium (Pd) supported thereon can be mentioned. Besides, catalysts substantially consisting of zeolite or comprising, as a main component, zeolite have an effect of considerably reducing the formation of NOx or $N_2O$.

By changing the ratio of the first component to the second component in the catalyst described above, it is possible to adjust the concentrations of $NH_3$ and NOx in the gas resulted in the $NH_3$ decomposition. For instance, when the ratio of the second component was reduced, the ratio of decomposition of $NH_3$ is slightly lowered, but the concentration of NOx in the resulting gas is considerably reduced.

In order to transfer the $NH_3$ contained in an $NH_3$-containing effluent from the effluent into a gas phase, a method in which the $NH_3$ contained in the effluent is stripped into the gas phase, specifically, for example, (a) a method in which a carrier gas is blown into the effluent, and (b) a method in which the effluent is sprayed in a carrier gas are used. When the effluent has a pH of 10 or higher, the stripping is performed as it is. On the other hand, when the effluent has a pH of lower than 10, an alkali such as sodium hydroxide and calcium hydroxide (slaked lime) is first added to the effluent to make its pH 10 or higher, and then the effluent is contacted with air to diffuse or evaporate the $NH_3$ into the air by using the air as a carrier gas. As the carrier gas, steam can be used in place of air. The term "carrier gas" as used herein generically means a gas which gas can diffuse or evaporate ammonia from the effluent.

An $NH_3$-containing gas is preheated at the time when the gas is introduced into a stripping tower or catalyst tower, when necessary. Preheating may be conducted by a usual method, for example, by heating with a burner or heat exchange with a gas at a high temperature such as steam or a gas discharged from a catalyst device. When the gas is circulated in the method and apparatus of the present invention, it is preferable to use a method in which the composition of the gas, especially the concentration of oxygen in the gas is not changed. (As an example, a method using an indirect heat exchange is preferable.)

In the case where an $NH_3$ decomposing catalyst having a denitrating function is used, it is important to control the temperature of a catalyst layer in a catalyst tower in the range of 250 to 450° C., preferably in the range of 350 to 400° C. In the case where a zeolite type catalyst is used, it is preferable to maintain the temperature of a catalyst layer in the range of 450 to 600° C. In any case, it is satisfactory that a suitable temperature is selected based on the performances of a catalyst.

The term "$NH_3$-containing effluent" used herein means an effluent containing ammonia nitrogen, such as an effluent discharged from a drain treating plant or sewerage treating facility, and an effluent discharged from a dry type electrostatic precipitator or wet type desulfurizing apparatus installed for removing respectively combustion ashes or $SO_2$ gas each contained in an exhaust gas discharged from a thermal power plant having a coal firing boiler or oil firing boiler. Also, the term "$NH_3$-containing effluent" includes effluents which contain an nitrogen converted into ammonia nitrogen by a pretreatment, such as an effluent in which an organic nitrogen originally contained in the effluent was decomposed into strippable ammonia nitrogen by a general biological treatment, and an effluent containing $NH_3$ at a high concentration and discharged at the time of the regeneration of a zeolite in a conventional ion exchange method used in various fields of industry.

BEST MODE FOR CARRYING OUT THE INVENTION

Now, the embodiments of the present invention are described in more detail with reference to drawings.

Figure 7:
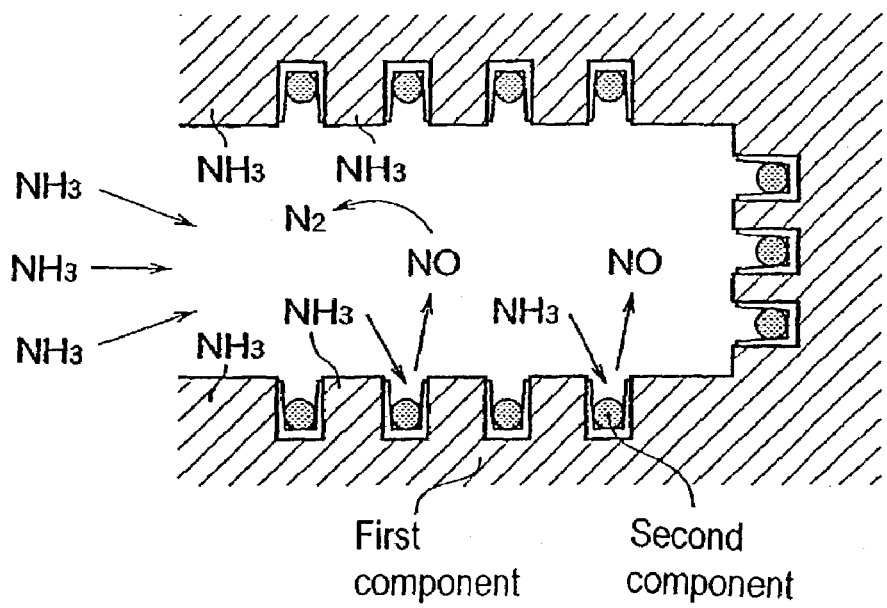
FIG. 7 is a diagram for illustrating the structure of an $NH_3$ decomposing catalyst having a denitrating function and used in the present invention, and briefly illustrating reactions performed therein.

The model of a fine pore in an $NH_3$ decomposing catalyst having a denitrating function and used in the present invention is shown in FIG. 7.

As demonstrated in FIG. 7, the fine pore has a structure in which micro-pores inherently contained in a porous silica exist at places within a macro-pore formed by a component (first component) on the surface of which NO is reduced by $NH_3$, and ultramicro-particles of another component (second component) having an activity of forming NOx from $NH_3$ are supported on the surface of the micro-pores of the silica. $NH_3$ diffuses within the macro-pore in a catalyst, the diffused $NH_3$ is oxidized on the second component to form NO according to the equation (1) described below, the NO collide with $NH_3$ adsorbed on the surface of the first component forming the macro-pore, in the course of diffusing outside the catalyst, and the $NH_3$ is reduced down to $N_2$ according to the equation (2) described below. As a whole, the $NH_3$ is changed as shown by equation (3) described below.

$$NH_3 + 5/4 O_2 \rightarrow NO + 3/2 H_2O \qquad (1)$$

$$NH_3 + NO + 1/4 O_2 \rightarrow N_2 + 3/2 H_2O \qquad (2)$$

$$NH_3 + 3/4 O_2 \rightarrow 1/2 N_2 + 3/2 H_2O \qquad (3)$$

As described above, it is possible to reduce $NH_3$ to $N_2$ while scarcely forming, as a final product, NO or $N_2O$ which is generally considered to be formed during the process of forming NO, when an $NH_3$ decomposing catalyst having a denitrating function is used, since the oxidizing reaction of $NH_3$ and the reducing reaction of formed NO with $NH_3$ proceed within the catalyst.

Besides, even when a zeolite is used, the amount of NO or $N_2O$ formed is extremely small.

However, even in the case where such catalyst is used, a phenomenon in which the concentration of $N_2O$ at the outlet of a catalyst tower becomes slightly high when the concentration of $NH_3$ in an effluent was high was observed. As a result of diligent investigations by the present inventors, it has been found out that the means described below is effective to such increase of the concentration of $N_2O$ at the outlet of a catalyst tower.

When the concentration of oxygen in a gas within a catalyst tower (herein, the concentration of oxygen in a gas to be introduced into a catalyst tower) is low, ammonia decomposition ratio and the concentration of the $N_2O$ contained in the resulting gas decrease, but the decrease in the concentration of $N_2O$ occurs at a higher concentration of oxygen than the oxygen concentration where the ammonia decomposition ratio comes to decrease. In an example, whereas the oxygen concentration at which the ammonia decomposition ratio begun to decrease was 3% or lower, $N_2O$ concentration begun to decrease when the oxygen concentration became 10% or lower. Thus, it has been found out that the $N_2O$ concentration can be reduced without lowering ammonia decomposition ratio by maintaining the oxygen concentration at a proper value (herein, 2 to 15%, preferably 2 to 10%).

Figure 1:
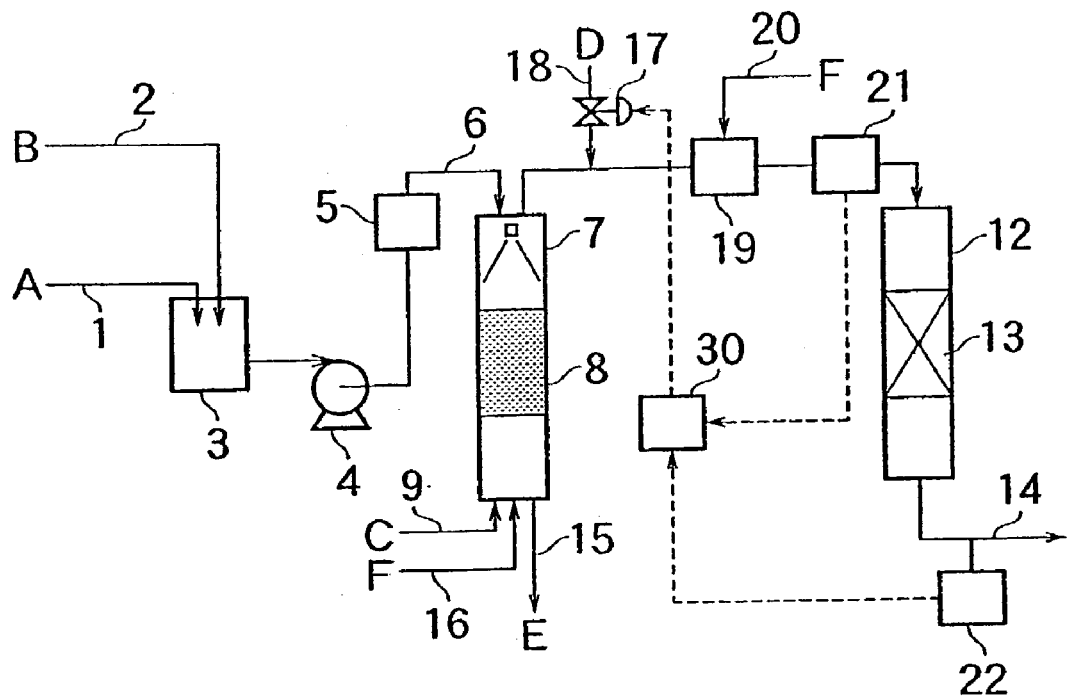
FIG. 1 is a flow diagram for illustrating an embodiment of the methods for treating an $NH_3$-containing effluent and the arrangements of devices in the apparatuses of the present invention.

FIG. 1 is a flow diagram showing a system of devices in the case wherein a method of the present invention for treating an $NH_3$-containing effluent is applied to an effluent containing ammonia nitrogen at a high concentration, for example, to an effluent discharged from a thermal power plant.

As shown in FIG. 1, effluent A and alkali B are supplied to tank 3 through pipe 1 and pipe 2, respectively, mixed within tank 3, and then fed to pre-heater 5 with pump 4. The effluent A preheated up to about 100° C. with pre-heater 5 is supplied to a top portion of stripping tower 7 through pipe 6. Within stripping tower 7, filler material 8 is placed. Steam C and combustion gas F are supplied as carrier gases through pipe 9 and pipe 16 connected to bottom portions of the tower, respectively, and rise within the tower while efficiently contacting with effluent A within the tower to obtain a gas containing ammonia at a high concentration. The concentration of $NH_3$ in the gas thus obtained is usually a few thousands to a few tens of thousands ppm. To the gas thus obtained is a proper amount of air D supplied through pipe 18 by adjusting the opening of regulating valve 17 according to the signals from a device for measuring oxygen concentration and a device for measuring $N_2O$ concentration both described below.

Another combustion gas F supplied from a combustion device (not shown in the drawing) is fed into pre-heater 19 through pipe 20, mixed therein with the gas containing ammonia, heated up to a prescribed temperature, and then introduced into catalyst tower 12. Near the inlet of catalyst tower 12, device 21 for measuring oxygen concentration is installed, and the oxygen concentration in the gas is determined with the device. The stripped ammonia contained in the gas is oxidized to decompose into $N_2$ and $H_2O$ on catalyst (layer) 13, and then discharged into the atmosphere through pipe 14.

The concentration of $N_2O$ at the outlet of the catalyst tower 12 is determined with device 22 installed near the outlet of catalyst tower 12 and used for measuring $N_2O$ concentration, the determined value thus obtained and the determined value obtained by device 21 for measuring oxygen concentration are inputted into control unit 30, and the control unit 30 controls the flow rate of air D to be supplied through pipe 18 with regulating valve 17 according to the determined values. From pipe 15 connected to a bottom portion of stripping tower 7, effluent E from which ammonia was removed is discharged.

Two combustion gases F supplied through pipe 16 and pipe 20, respectively, may be gases other than combustion gases so far as the gases have high temperatures and low oxygen concentrations. The catalyst used in catalyst tower 12 comprises a first component having an activity of reducing nitrogen oxides with $NH_3$ and a second component having an activity of forming nitrogen oxides (NOx) from $NH_3$. Further, the reaction temperature in catalyst layer 13 at the time of operation is 250 to 450° C., preferably 350 to 400° C.

According to the embodiment shown in FIG. 1, it is possible to remove ammonia at a high efficiency while suppressing the formation of $N_2O$ by controlling the amount of oxygen in the catalyst device. Besides, according to the embodiment shown in FIG. 3, heat loss released outside the system is reduced since the amount of the gas discharged outside the system is decreased in addition to the effect described above. Thus, a small amount of heating energy is satisfactory in the pre-heater.

Figure 3:
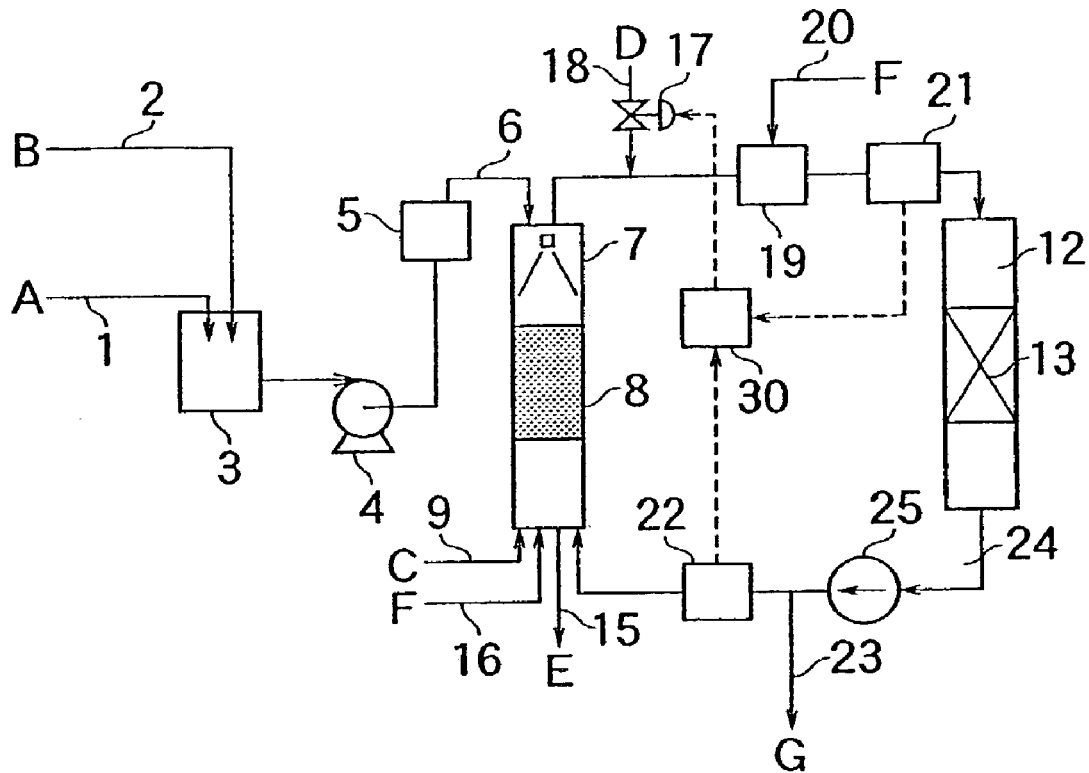
FIG. 3 is a flow diagram similar to that of FIG. 1, showing another embodiment of the present invention.

FIG. 3 is a diagram showing a system of devices in another embodiment of the present invention. Its difference from the system used in the apparatus shown in FIG. 1 is that a part of the gas discharged from catalyst tower 12 is returned to stripping tower 7 with fan 25 through pipe 24 to employ as a part of a carrier gas thereby the amount of heating energy can be reduced.

That is, Gas G containing $N_2$ and $H_2O$ formed by the decomposition of the ammonia leaves catalyst tower 12 and passes through pipe 24, a part of the gas is discharged through pipe 23 into the atmosphere, and the remaining part of the gas is returned to stripping tower 7 with fan 25. It is the same as in the case of FIG. 1 that the concentration of $N_2O$ at the outlet of catalyst tower 12 is determined by $N_2O$ concentration measuring device 22 installed at a midway of pipe 24, the determined value thus obtained and the determined value obtained by oxygen concentration measuring device 21 are inputted into control unit 30, and the control unit 30 controls the flow rate of the air supplied through pipe 18, with regulating valve 17 according to the determined values.

Whereas steam C and combustion gas F (supplied through pipe 16) are used as a stripping gas in the case of the apparatus shown in FIG. 3, pipe 16 (for supplying combustion gas F) can be omitted, for example, by controlling the amount of the circulating gas from pipe 24, or by providing a pre-heater at pipe 9.

Whereas $N_2O$ concentration measuring device 22 is used in the system of devices shown in FIG. 1 and FIG. 3, it is not necessary to always use the device 22. For instance, it is sufficient that the range of proper oxygen concentrations at which ammonia decomposition ratio is high and $N_2O$ concentration in the gas discharged from a catalyst tower can be decreased lower than a prescribed value is ascertained in advance and then the oxygen concentration is adjusted so as to become a concentration within the ascertained range.

Figure 4:
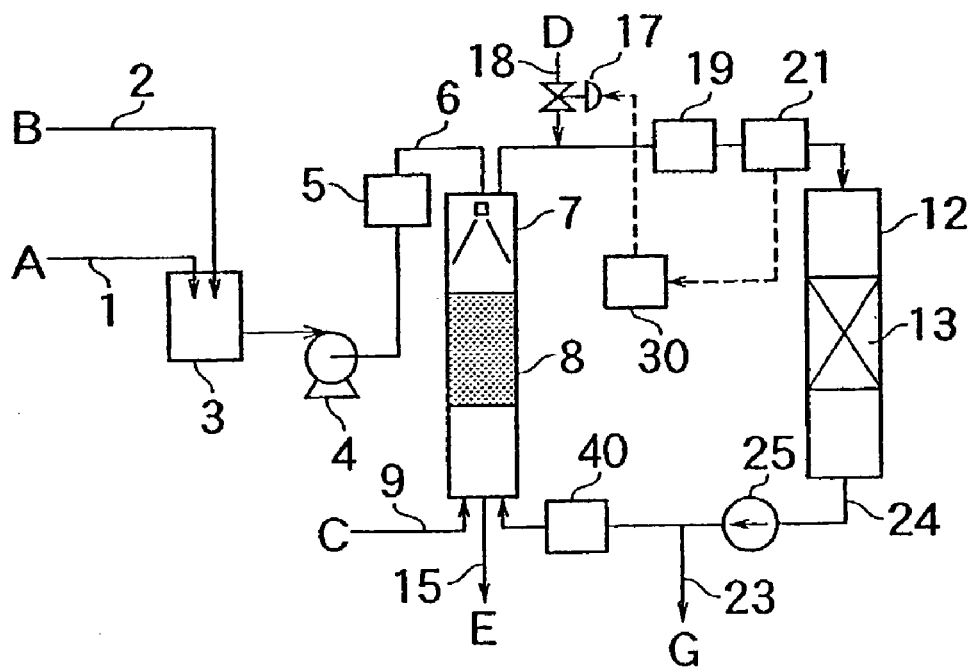
FIG. 4 is a flow diagram similar to that of FIG. 1, showing still another embodiment of the present invention.

FIG. 4 shows the same diagram of the system of devices as shown in FIG. 3 with the exception that $N_2O$ concentration measuring device 22 is omitted and pipe 16 for supplying combustion gas F as a stripping gas is omitted by providing pre-heater 40.

In the apparatuses described above, air D is added through pipe 18 to the gas discharged from stripping tower 7 and containing ammonia at a high concentration, and the gas mixture is introduced into catalyst tower 12, after preheated up to a prescribed temperature with pre-heater 19, when necessary. The amount of air D added through pipe 18 is adjusted so that the amount of oxygen contained in the air becomes equal to the amount consumed by the decomposition reaction performed on catalyst 13. In this connection, it is possible to add oxygen gas instead of air. The gas containing the stripped ammonia is contacted with catalyst 13 used for decomposing $NH_3$ and having a denitrating function to oxidatively decompose the ammonia into $N_2$ and $H_2O$ on the catalyst 13 described above. The reaction temperature at this time in catalyst layer 13 is 250 to 450° C., preferably 350 to 400° C. in the case of an $NH_3$ decomposing catalyst having a denitrating function, and preferably 450 to 600° C. in the case of a zeolite type catalyst. Gas G containing $N_2$ and $H_2O$ formed by the decomposition of ammonia is returned to stripping tower 7 with fan 25 as a part of a carrier gas through pipe 24, after the gas temperature is raised with pre-heater 40, when necessary. A part of gas G is discharged outside the system through pipe 23 connected to pipe 24 at a position between fan 25 and pre-heater 40. It is sufficient that the amount of the gas discharged outside the system through pipe 23 is the same as the-amount of oxygen consumed in catalyst tower 12, specifically the same as the increased amount of a gas such as air D added through pipe 18. In order to control the amount of the gas to be discharged through pipe 23, it is sufficient that the gas pressure within the system at a prescribed place is determined and the gas is discharged so that the gas pressure at that place becomes constant.

The moisture in gas G is condensed into water by cooling the gas with a condenser (not shown in the drawings). A slight amount of $NH_3$ contained in the gas may be recovered together with the condensed water. Alternatively, the $NH_3$ contained in the gas may be absorbed in a liquid (not shown in the drawings) containing an acid such as sulfuric acid by contacting the discharged gas with the liquid. From pipe 15. connected to a bottom portion of stripping tower 7, effluent E from which ammonia was removed is discharged. While steam C supplied through pipe 9 is necessary at the initial stage of operation, it becomes unnecessary when the temperature within stripping tower 7 became sufficiently high. Fan 25 may be located at a place other than that shown in FIG. 4. For instance, the place may be the middle point between stripping tower 7 and catalyst tower 12, but the location shown in FIG. 4 is preferable from the viewpoint of holding the inside of the catalyst tower at a negative pressure and preventing a possible gas leakage.

With respect to the composition of the gas in catalyst tower 12 shown in FIG. 4 before and after the reaction, only the amounts of $NH_3$ and $O_2$ contained in the gas before the reaction decrease during the reaction and an equal amount of $N_2$ and $H_2O$ are formed. In general, there is no case where the gas composition is largely changed by the reaction since the $NH_3$ concentration in the gas to be treated is a few thousands ppm. Then, it becomes possible to circulate the gas once-subjected to an $NH_3$ decomposition reaction to use as a part of a carrier gas, by introducing air in an amount commensurate with the amount of consumed oxygen in the system and taking the increased portion of the gas outside the system. By conducting such procedures, a heat source and related parts (in this case, one of combustion gases F and pipe 16 in FIGS. 1 and 3) for preheating a carrier gas, and in some cases, a heat exchanger used when the gas discharged from a catalyst tower is preheated can be made unnecessary.

Further, it becomes easy to remove a slight amount of $NH_3$ contained in a discharged gas since the amount of the gas discharged outside the system becomes a few tenths to one hundredth of the amount in a conventional case. For instance, $NH_3$ can be recovered together with water by lowering the temperature of the gas to condense the moisture contained in the gas into water since $NH_3$ easily dissolves in water. Alternatively, it is possible to contact the discharged gas with a liquid containing an acid such as sulfuric acid to have the $NH_3$ in the gas absorbed in the liquid.

Still further, it is possible to decrease the concentrations of $NH_3$ and NOx in the treated gas down to an extremely low level, since NOx concentration reduces by using a device for measuring ammonia concentration in place of a device for measuring $N_2O$ concentration used in the system of devices shown in FIGS. 1 and 3, and conducting the operation under the conditions wherein the $NH_3$ concentration in the gas at the outlet of a catalyst tower layer is increased up to a prescribed value.

Figure 5:
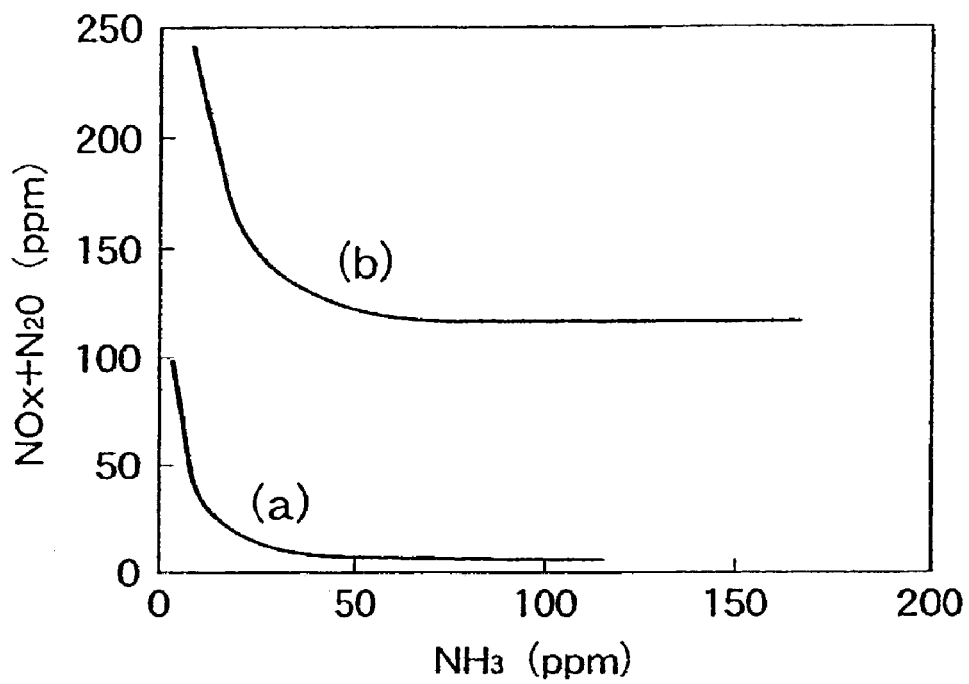
FIG. 5 is a line diagram showing the relation between the concentration of ammonia and the concentration of the sum of NOx and $N_2O$ in the gas discharged from a catalyst tower in the embodiment of the present invention shown in FIG. 4.

An example of the relation between the $NH_3$ concentration and the concentration of the sum of NOx and $N_2O$ at the outlet of a catalyst layer is shown in FIG. 5. As a parameter changing the $NH_3$ concentration of the abscissa, for example, the contact time between the gas discharged from a stripping tower and a catalyst can be mentioned in addition to the second component in the catalyst described above. When the contact time between the gas discharged from a stripping tower and a catalyst was shortened by increasing the flow rate of the gas or by reducing the amount of the catalyst, the concentration of $NH_3$ at the outlet of a catalyst layer increases. It is possible to make the concentration of the sum of NOx and $N_2O$ in the gas at the outlet of a catalyst tower lower than 1 ppm as shown by curve (a) in FIG. 5 by selecting an appropriate catalyst and maintaining the $NH_3$ concentration in the gas at the outlet exit of a catalyst layer at 50 ppm or higher, preferably about 100 ppm. As such a catalyst, an ammonia decomposing catalyst having a denitrating function can be mentioned. However, when an appropriate catalyst is not selected, the concentration of the sum of NOx and $N_2O$ in the gas at the outlet of a catalyst layer can not be lowered even if the $NH_3$ concentration in the gas at the outlet of the catalyst layer was increased up to the highest as shown by curve (b) in FIG. 5.

Next, specific examples of the present invention are described.

EXAMPLE 1

Ammonium paratungstate $((NH_4)_{10}H_{10}.W_{12}O_{46}.6H_2O)$ in an amount of 2.5 kg and 2.33 kg of ammonium meta-vanadate were added to 67 kg of a slurry of metatitanic acid ($TiO_2$ content: 30 wt %, $SO_4$ content: 8 wt %) and mixed by using a kneader. The paste thus obtained was granulated, dried, and then calcined at 550° C. for 2 hours. The granules thus obtained were ground to obtain powders as a first component of a catalyst. The powders had a composition of Ti/W/V=91/5/4 (ratio of atoms). On the other hand, 500 g of fine powders of silica (produced by Tomita Pharmaceuticals Co., Ltd.; trade name: Micon F) was added to 1 L of $1.33 \times 10^{-2}$ wt % of chloroplatinic acid $(H_2[PtCl_6].6H_2O)$, evaporated to dryness on a sand bath, and then calcined at 500° C. for 2 hours in the air to prepare 0.01 wt % $Pt.SiO_2$ powders as a second component of the catalyst.

Next, 5.3 kg of silica.alumina type inorganic fibers and 17 kg of water were added to the mixture of 20 kg of the first component and 40.1 g of the second component, and kneaded to obtain a catalyst paste. Separately, a net-like product made of E glass fibers was impregnated with a slurry containing a titania, silica sol and polyvinyl alcohol, dried at 150° C. to prepare catalyst substrates. Between the catalyst substrates was the catalyst paste described above held and they were passed through press rollers to roll, thereby obtaining a plate-like product. After the plate-like product was air-dried in the atmosphere for 12 hours, it was calcined at 500° C. for 2 hours to obtain an $NH_3$ decomposing catalyst having a denitrating function. In the catalyst thus obtained, the ratio of the second component to the first component (the second component/the first component) was 0.2/99.8.

Figure 2:
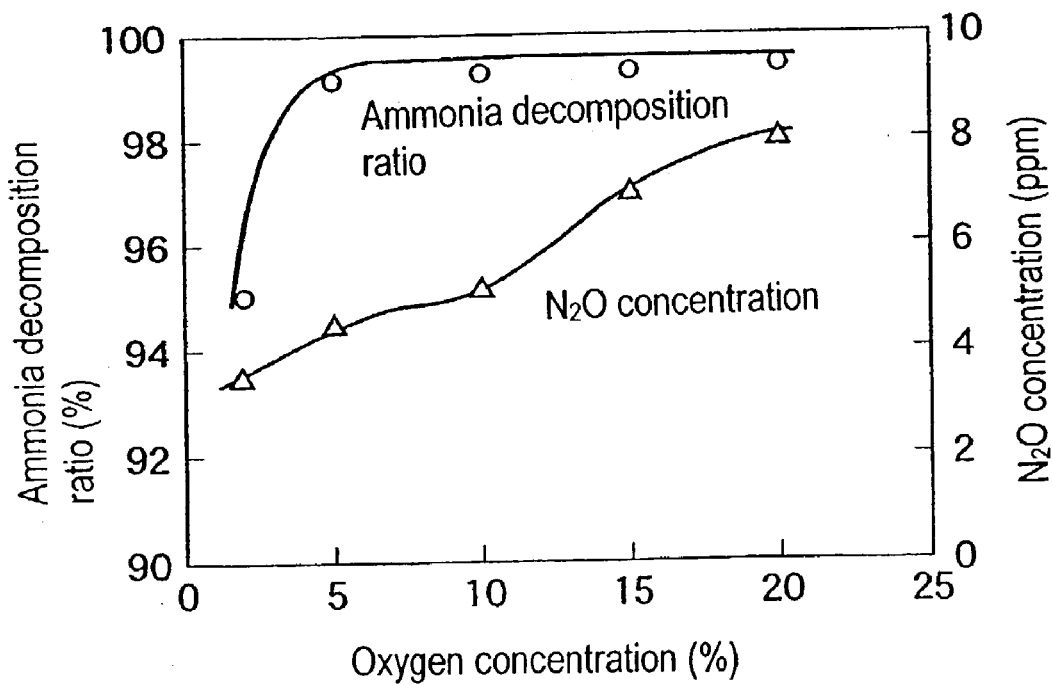
FIG. 2 is a line graph showing the relation between the concentration of oxygen gas introduced into a catalyst tower, and ammonia decomposition ratio and $N_2O$ concentration in the resulting gas when an ammonia-containing effluent was treated in the embodiment shown in FIG. 1.

A test for treating an effluent was conducted by using the catalyst obtained and the apparatus as shown in FIG. 1 under the conditions shown in Table 1. The effects of oxygen concentration in the gas in catalyst tower 12 on the decomposition ratio of ammonia and the concentration of formed $N_2O$ in the resulting gas are shown in FIG. 2. As will be seen from FIG. 2, the $N_2O$ concentration was capable to being lowered while maintaining a high ammonia decomposition ratio by maintaining the oxygen concentration at the inlet of catalyst layer 13 within the range of 5 to 10%.

Although it varies according to the catalyst to be used and the composition of the effluent to be treated, oxygen concentrations appropriate for lowering the $N_2O$ concentration while maintaining a high ammonia decomposition ratio was 2 to 15% (more preferably 5 to 10%).

TABLE 1

| Item | Condition |
|---|---|
| Rate of treating effluent | 1.6 L/h |
| Amount of $NH_4^+$ in effluent | 2,000 mg/L |
| Gas flow rate at inlet of catalyst layer | 0.8 m³/h |
| Gas composition | $NH_3$: 10,000 ppm |
|  | $H_2O$: 28% |
|  | Air: the remainder |
| Temperature | 400° C. |
| Areal velocity | 5 m/h |

EXAMPLE 2

A test for treating an effluent was conducted by using the catalyst prepared by the same way as in Example 1 and the apparatus as shown in FIG. 4 under the conditions shown in Table 2. In this test, the amount of the air supplied through pipe 18 was adjusted so that the flow rate of the gas discharged outside the system through pipe 23 became 0.03 m³/h. While the concentration of $NH_3$ in gas G discharged was 100 ppm, that of NO was 0.6 ppm, and that of $N_2O$ was 18 ppm, the $NH_3$ concentration was reduced down to lower than 0.1 ppm by contacting the discharged gas with a diluted sulfuric acid. Besides, the amount of steam necessary for preheating a gas and liquid was kg/kg⁻.

TABLE 2

| Item | Condition |
|---|---|
| Rate of treating effluent | 1.6 L/h |
| Amount of $NH_4^+$ in effluent | 2,000 mg/L |
| Gas flow rate at inlet of catalyst layer | 1.3 m³/h |
| Gas composition | $NH_3$: 3,000 ppm |
|  | $H_2O$: 28% |
|  | Air: the remainder |
| Temperature | 350° C. |
| Areal velocity | 17 m/h |

COMPARATIVE EXAMPLE 1

The first component and the second component of a catalyst were prepared by the same way as in Example 1, and then 5.3 kg of silica.alumina type inorganic fibers and 17 kg of water were added to the mixture of 20 kg of the first component and 202 g of the second component to obtain a catalyst paste. Separately, a net-like product made of E glass fibers was impregnated with a slurry containing a titania, silica sol, and polyvinyl alcohol, and dried at 150° C. to prepare catalyst substrates. Between the catalyst substrates was the catalyst paste described above held and they were passed through press rollers to roll, thereby obtaining a plate-like product. After the plate-like product was air-dried in the atmosphere for 12 hours, it was calcined at 500° C. for 2 hours to obtain an $NH_3$ decomposing catalyst having a denitrating function. In the catalyst thus obtained, the ratio of the second component to the first component (the second component/the first component) was 1.0/99.0.

A test for treating an effluent was conducted by using the catalyst thus obtained without circulating the treated gas under the same conditions as in Example 1. As the result, the flow rate of the gas discharged outside the system through pipe 14 was 1.3 m³/h, and concentration of the $NH_3$ in the treated gas was 5 ppm, that of NO was 1 ppm, and that of $N_2O$ was 21 ppm. Besides, the amount of steam necessary for preheating a gas and liquid was 0.25 kg/kg⁻.

From the comparison between Example 2 and Comparative Example 1, it is understood that in Example 2, the concentrations of NO and $N_2O$ in the gas at the outlet of the catalyst layer were low, the gas flow rate became lower than ¹/₄₀, and the amount of discharged hazardous or poisonous gases was considerably reduced compared with Comparative Example 1. Also, the amount of steam necessary for the preheating becomes less than ½ of that in Example 2.

Figure 6:
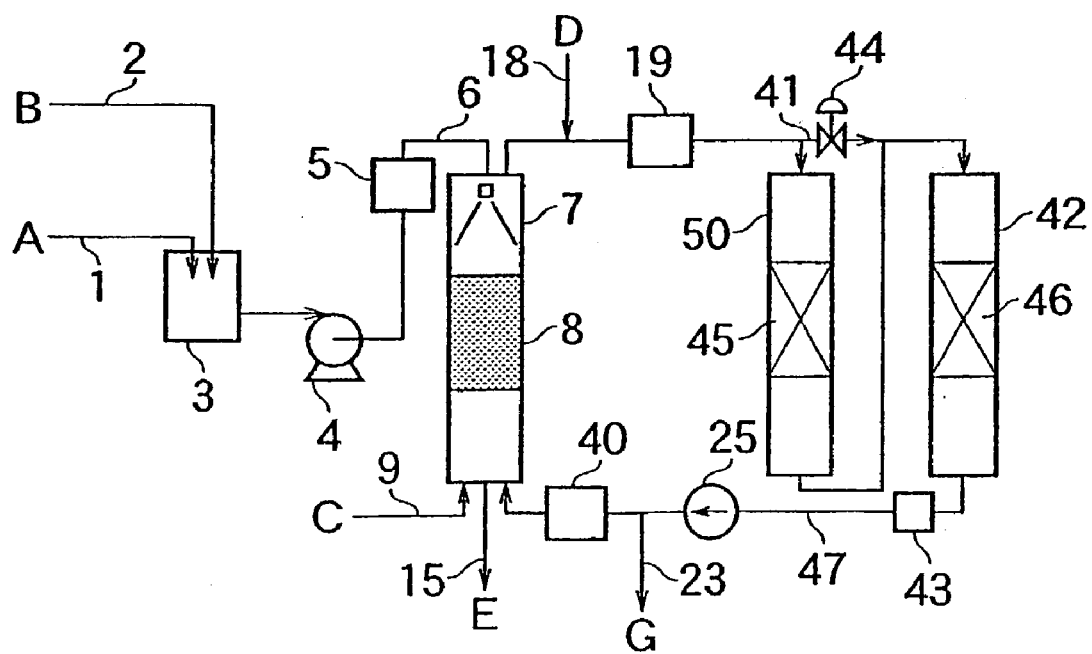
FIG. 6 is a flow diagram showing the method and the apparatus of the present invention in the case where two catalyst towers are used.

According to the embodiments shown in FIG. 4 and FIG. 6, the $NH_3$ contained in an $NH_3$-containing effluent can be removed at a high efficiency at small amounts of NOx, NO, and $N_2O$ to be formed. Further, the energy necessary for heating a liquid and a gas in the treatment of an $NH_3$-containing effluent, and the amount of a gas containing a hazardous or harmful substance and discharged can considerably be reduced.

Even in the case where an $NH_3$ decomposing catalyst of the present invention having a denitrating function was used, a phenomenon in which the concentration of NO or $N_2O$ in the gas at the outlet of a catalyst tower became slightly high was observed when the $NH_3$ concentration in the gas treated in a catalyst tower (catalyst tower 12 in FIGS. 1 to 4) was decreased to lower than a prescribed value. This is considered due to the fact that when the reaction shown by the equation (1) described above was accelerated by increasing the amount of a second component in a catalyst in order to lower the $NH_3$ concentration in the treated gas, the concentration of NO becomes too high and the amount of $NH_3$ necessary for the reaction shown by the equation (2) described above becomes insufficient. On the other hand, when the amount of a second component in a catalyst was decreased, the concentrations of NOx and $N_2O$ lower, but a problem that the concentration of $NH_3$ in the treated gas becomes high arises.

Figure 8:
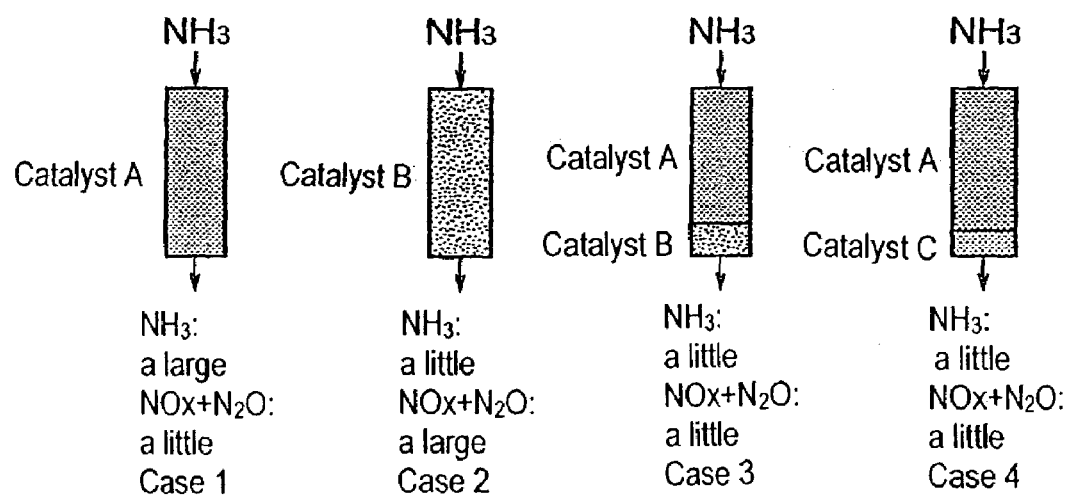
FIG. 8 is a diagram for illustrating the effects by which ammonia is removed when a catalyst having a relatively low power for oxidizing $NH_3$ and/or a catalyst having a relatively high-power for oxidizing $NH_3$ is used.

This fact is diagrammatically shown in FIG. 8. As shown in the drawing, in the case of catalyst A (case 1 in FIG. 8), the $NH_3$ concentration at the end of the treatment is high since the amount of a second component in a catalyst is small, and in the case of catalyst B (case 2 in FIG. 8), the concentrations of NOx and $N_2O$ at the end of the treatment are high since the amount of a second component is large. It has now been found out that the following methods (case 3 and case 4 in FIG. 8) are effective for lowering simultaneously not only the concentration of $NH_3$ but also the concentrations of NOx and $N_2O$ in the gas at the time when the treatment with a catalyst was completed.

That is, an $NH_3$-containing gas heated up to a prescribed temperature is contacted with a catalyst A having a relatively low power of oxidizing $NH_3$ to decompose a part of the $NH_3$ described above into nitrogen and water. At this time, about 10% of the $NH_3$ contained in the original gas remains unreacted, but the concentrations of NOx and $N_2O$ in the resulting gas are small. The $NH_3$ remained unchanged is then contacted with catalyst B having a relatively high power of oxidizing $NH_3$ to decompose almost all remaining $NH_3$ into nitrogen and water (case 3 in FIG. 8). When the gas was contacted with catalyst B having a relatively high power of oxidizing $NH_3$, NOx and $N_2O$ tend to be formed. However, the concentrations of NOx and $N_2O$ in the finally resulting gas can be decreased since the $NH_3$ concentration at the stage just prior to the reaction by catalyst B is lowered down to about one tenth of the original concentration by catalyst A. The term "power of oxidizing $NH_3$" used herein means the oxidizing power per unit volume of a catalyst.

Also, a method in which an $NH_3$-containing gas is contacted first with catalyst A having a relatively low power of oxidizing $NH_3$ to decompose a part of the $NH_3$ described above into nitrogen and water and then contacted with zeolite catalyst C (case 4 in FIG. 8) is effective. Especially, this method is effective for reducing the concentration of $N_2O$ in the finally resulting gas since a certain type of zeolite catalyst C has a function of decomposing $N_2O$.

Figure 9:
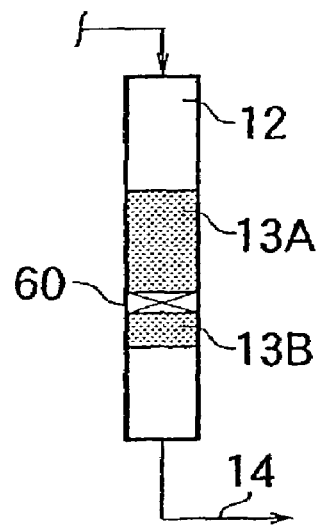
FIG. 9 is a diagram for illustrating the structure of a catalyst tower when two of the catalysts shown in FIG. 8 are used in the tower.

FIG. 9 shows another example of catalyst tower 12 used in the system of devices shown in FIG. 1. In other words, FIG. 9 is a diagram for illustrating a catalyst device in which catalyst layer 13A having a relatively low power of oxidizing $NH_3$ and catalyst layer 13B having a relatively high power of oxidizing $NH_3$ are packed in the direction of gas flow within the tower. In the device of FIG. 9, an $NH_3$-containing gas adjusted to a prescribed temperature and oxygen concentration as in the case of Example 1 in advance is introduced into catalyst tower 12, and contacted with catalyst layer 13A having a relatively low power of oxidizing $NH_3$ to decompose a part of the $NH_3$ into nitrogen and water. At this time, about 10% of the $NH_3$ in the introduced gas remains unreacted. The $NH_3$ remained unreacted is then contacted with catalyst 13B having a relatively high power of oxidizing $NH_3$ to decompose almost all remaining $NH_3$ into nitrogen and water, and the gas thus resulted is discharged into the atmosphere through pipe 14. Further, device 60 for mixing a gas is provided between catalyst layer 13A and catalyst layer B, when necessary, so that the gas once-subjected to the decomposition with catalyst 13A is supplied to catalyst layer 13B after the gas was made uniform. The reaction temperature in catalyst layers 13 at this time is 250 to 500° C., preferably 350 to 450° C.

EXAMPLE 3

A test for treating an effluent was conducted in the same manner as in Example 2 while using the apparatus comprising a device system similar to that shown in FIG. 4 with the exception that two catalyst towers of catalyst tower 50 for oxidizing $NH_3$ and catalyst tower 42 for reducing NOx were installed. FIG. 6 shows the device system used in this example.

In the apparatus shown in FIG. 6, air D was added to the exhaust gas discharged from stripping tower 7 and containing ammonia at a high concentration. The mixed gas is preheated with pre-heater 19 up to a prescribed temperature, when necessary, and then introduced into oxidizing catalyst tower 50 in which an oxidizing catalyst as a second component is packed. However, a part of the (preheated) mixed gas is supplied through by-pass line 41 to reducing catalyst tower 42 in which a reducing catalyst as a first component is packed, and NOx is reductively decomposed into NO and $N_2$. The amount of the gas to be supplied to reducing catalyst tower 42 through by-pass line 41 is adjusted by controlling the opening of valve 44 based on the indicated value of ammonia meter 43 placed near the outlet of reducing catalyst tower 42 so that the concentration of the $NH_3$ in the treated gas becomes a prescribed value (for example, a value within the range of 50 to 100 ppm). On oxidizing catalyst 45 in oxidizing catalyst tower 50, $NH_3$ is decomposed according the equation (3) described below. However, oxidizing reactions of the following equation (1) and equation (4) both described below occur at the same time to form NO and $N_2O$. Then, in order to remove the NO formed, these gases are introduced together with $NH_3$-containing gas supplied through by-pass line 41 into reducing catalyst tower 42, and NO is reduced to disappear on reducing catalyst 46 according the following equation (2).

$$NH_3 + 5/4O_2 \rightarrow NO + 3/2H_2O \quad (1)$$

$$NH_3 + NO + 1/4O_2 \rightarrow N_2 + 3/2H_2O \quad (2)$$

$$NH_3 + 3/4O_2 \rightarrow 1/2N_2 + 3/2H_2O \quad (3)$$

$$NH_3 + 2O_2 \rightarrow 1/2N_2O + 3/2H_2O \quad (4)$$

The gas discharged from the outlet of reducing catalyst tower 42 is returned to stripping tower 7 by fan 25 as a part of a carrier gas after the temperature of the gas was raised with pre-heater 40, when necessary.

Even in this example, it is possible to adjust the concentration of $NH_3$ and lower the concentration of NO in the gas at the outlet of reducing catalyst tower 42 by adjusting the concentration of the $NH_3$ in the gas at the outlet of tower 42 with valve 44 based on the indicated value of ammonia meter 43 placed near the outlet of reducing catalyst tower 42. Also, the amount of the energy necessary for heating a gas and liquid can be decreased by circulating the gas discharged from the outlet of reducing catalyst tower 42 to stripping tower 7.

In this connection, it is preferable to use an $NH_3$ decomposing catalyst 13 as shown in FIG. 4 having a denitrating function since two catalyst towers are required and it is necessary to adjust the amount of $NH_3$ necessary for reducing $NO_x$ by the opening of valve 44 based on the indicated value of ammonia meter 43 placed near the outlet of reducing catalyst tower 42 in this example.

Next, a specific example in which the catalyst device as shown in FIG. 9 was used is described.

EXAMPLE 4

In the device as shown in FIG. 9, a catalyst which was prepared by the same method for preparing a catalyst as that used in Example 1 with the exception that 20 kg of a first component of catalyst and 202 g of a second component of catalyst were used and thus the ratio of the second component to the first component (the second component/the first component) was changed to 1/99 (in this case, Pt content corresponds to 1 ppm, excepting the weight of a catalyst substrate and inorganic fibers) was used as $NH_3$ decomposing catalyst 13A having a denitrating function. Likewise, $NH_3$ decomposing catalyst 13B having a Pt content of 5 ppm and comprising 20 kg of a first component and 404 g of a second component mixed therein was prepared by the same method for preparing a catalyst as that described in Example 1. A test for treating an effluent was conducted by using catalyst tower 12 as shown in FIG. 9 under the conditions shown in Table 3. The relation between the concentration of the sum of $NO_x$ and $N_2O$, and the reaction temperature at the time of starting the test is shown by curve (a) in FIG. 10.

TABLE 3

| Item | Condition |
| --- | --- |
| Rate of treating effluent | 1.6 L/h |
| Amount of $NH_4^+$ in effluent | 2,000 mg/L |
| Gas flow rate at inlet of catalyst layer | 1.3 m$^3$/h |
| Gas composition | $NH_3$: 10,000 ppm |
| | $H_2O$: 30% |
| | Air: the remainder |
| Temperature | 350° C. |
| Areal velocity | 10 m/h |

COMPARATIVE EXAMPLE 2

A test for treating effluent was conducted under the same conditions as those in Example 4 with the exception that only catalyst 13B was used as catalyst. The result thus obtained is shown by curve (b) in FIG. 10.

Figure 10:
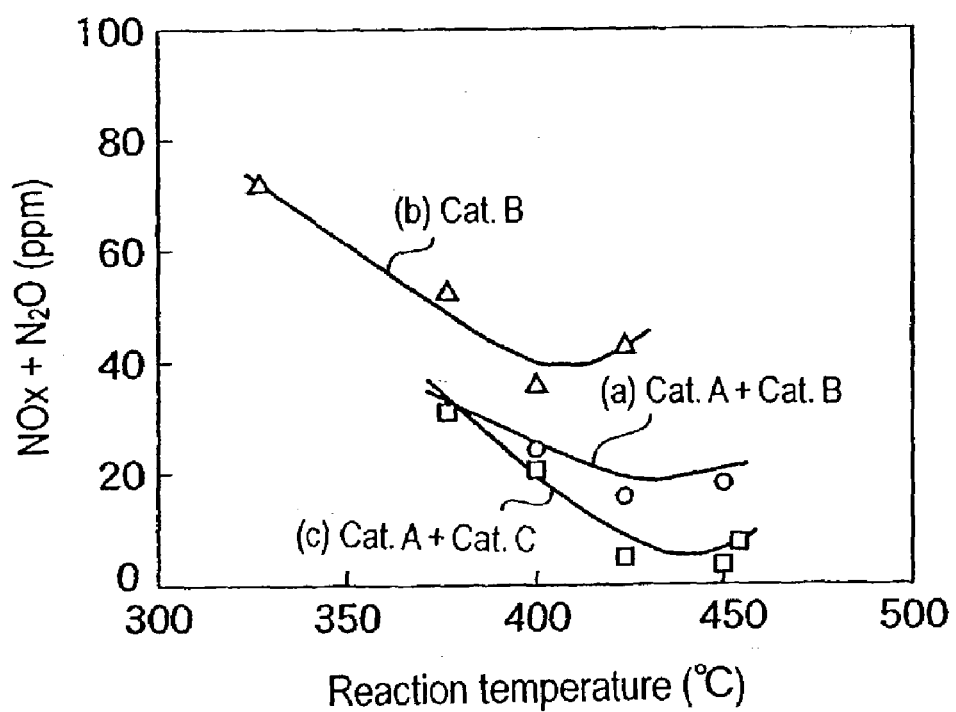
FIG. 10 is a line graph showing the relation between the reaction temperature and the concentration of the sum of NOx and $N_2O$ contained in the gas discharged from a catalyst tower when two of the catalysts shown in FIG. 8 were used.

From FIG. 10, it can be understood that the concentration of the sum of $NO_x$ and $N_2O$ can largely be reduced in the test of Example 4 compared with the test in Comparative Example 2.

EXAMPLE 5

A test for treating an effluent was conducted by using the same catalyst under the same conditions as those used in Example 4 with the exception that a mordenite having iron supported thereon was used in place of catalyst 13B. The relation between the concentration of the sum of $NO_x$ and $N_2O$, and the reaction temperature when a test for treating an effluent was conducted by using the catalyst of this example under the same conditions as in Example 4 is shown by curve (c) in FIG. 10. As will be understood from FIG. 10, the concentration of the sum of $NO_x$ and $N_2O$ can further be reduced according to this example than the concentration obtained in Example 4 since a mordenite having iron supported thereon has a function of decomposing $N_2O$.

Figure 11:
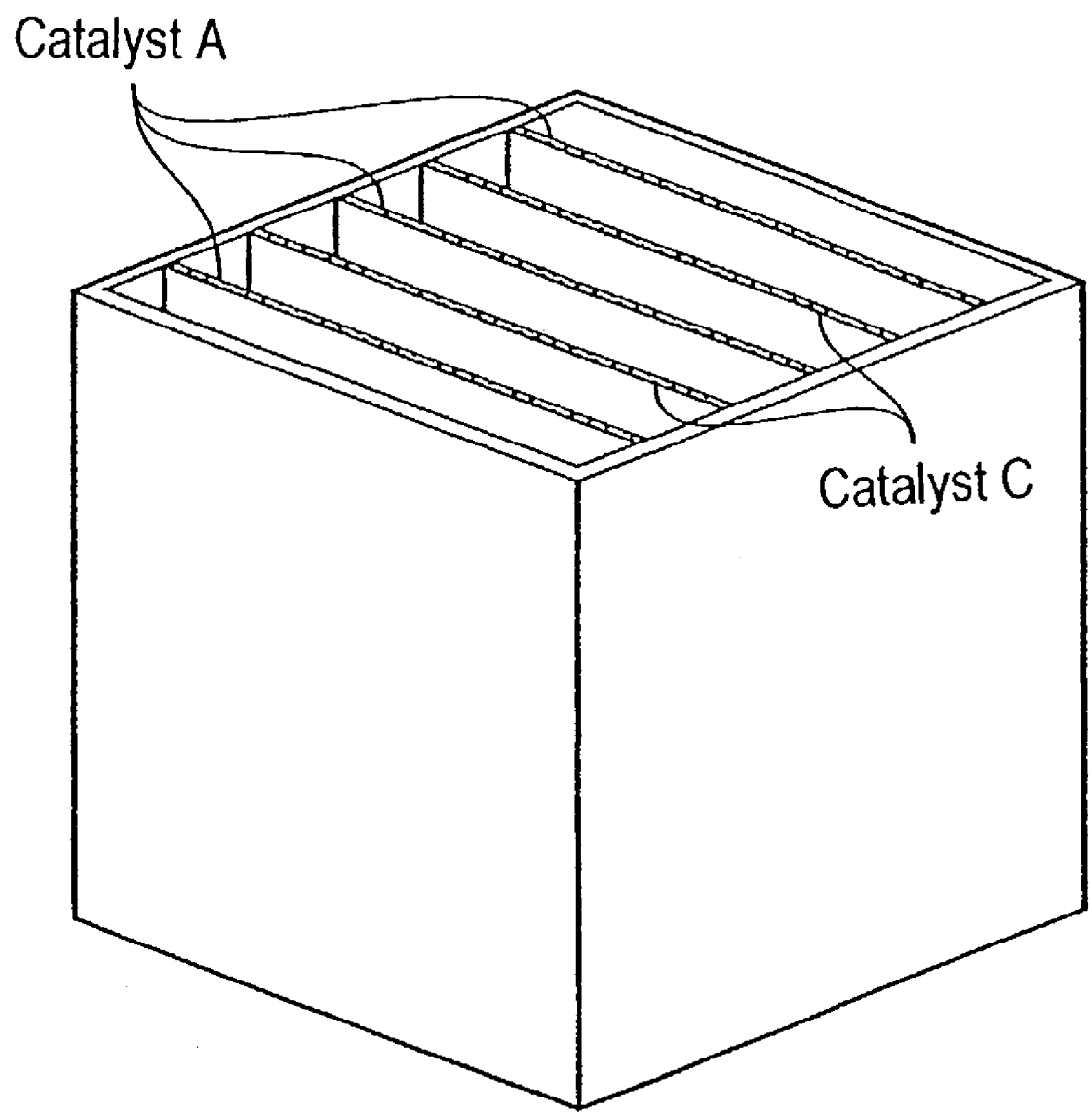
FIG. 11 is a diagram of a catalyst device prepared by using two kinds of plate-like catalysts each comprising one type of catalyst, in the case where two catalysts shown in FIG. 8 were used.

Whereas catalyst layer 13A and catalyst 13B each having a different composition are arranged in series in the embodiment shown in FIG. 9, plural catalyst layers can be arranged in parallel in a catalyst device as shown in FIG. 11. Thus, it is possible to increase $NH_3$ decomposition ratio to a high level and suppress the $NO_x$ concentration and $N_2O$ concentration in the gas at the outlet of a catalyst tower to a low level by alternately arranging plate-like catalysts comprising catalyst A or catalyst C (a catalyst having a function of decomposing $N_2O$) in a catalyst device as shown in FIG. 11. Further, in the case where the length of a catalyst layer cannot be extended by constraints from an apparatus, a method in which a device as shown in FIG. 11 is used is effective. It is also effective to dispose catalysts of another shape such as a honeycomb shape in a catalyst device as shown in FIG. 11.

According to the embodiments as shown in FIG. 9 and FIG. 11, the problem that when the $NH_3$ concentration in the gas once-treated in a catalyst tower was reduced to lower than a prescribed value, $NO_x$ concentration and $N_2O$ concentration in the gas at the outlet of a catalyst tower become slightly high is resolved, and the amounts of hazardous substances produced can considerably be reduced.

INDUSTRIAL APPLICABILITY

The present invention can be applied to the treatment of effluents containing an ammonia nitrogen at a high concentration such as an effluent discharged from a thermal power plant, and the ammonia can be removed from the effluent at a high efficiency while reducing the amount of $N_2O$ or the like formed at that time.

The invention claimed is:

1. A method for treating an ammonia-containing effluent comprising a stripping step in which the ammonia ($NH_3$) contained in the $NH_3$-containing effluent is transferred with a carrier gas from the effluent into a gas phase, a step for adding an oxygen-containing gas to the $NH_3$-containing gas produced at the stripping step, and an $NH_3$ decomposing step in which the oxygen-containing gas and the $NH_3$-containing gas are contacted with a catalyst used for decomposing $NH_3$, at a temperature in the range of 250° C. to 450°, which catalyst comprises, as a first component, an oxide of titanium (Ti) and an oxide of one or more elements selected from the group consisting of tungsten (W), vanadium (V), and molybdenum (Mo), and, as a second component, a silica, zeolite, and/or alumina having one or more noble metals selected from the group consisting of platinum (Pt), iridium (Ir), rhodium (Rh), and palladium (Pd) supported thereon, the concentration of oxygen in the gas mixture introduced into the $NH_3$ decomposing step being controlled within a range of 2 to 15% in the $NH_3$ decomposition step such that the $N_2O$ concentration is reduced while the $NH_3$ decomposition ratio remains generally unchanged.

2. The method according to claim 1, wherein the $N_2O$ concentration in the gas resulted in the $NH_3$ decomposing step is from about 4 to about 7 ppm.

3. The method according to claim 1, wherein the oxygen concentration introduced into the $NH_3$ decomposing step is controlled within a range of 2 to 10%.

4. The method according to claim 1, wherein the oxygen concentration introduced into the $NH_3$ decomposing step is controlled within a range of 5 to 10%.

* * * * *

UNITED STATES PATENT AND TRADEMARK OFFICE
CERTIFICATE OF CORRECTION

PATENT NO.         : 7,160,527 B2
APPLICATION NO. : 10/343754
DATED              : January 9, 2007
INVENTOR(S)        : Hirofumi Kikkawa et al.

It is certified that error appears in the above-identified patent and that said Letters Patent is hereby corrected as shown below:

Title page item (54) and Col. 1 should read --(54) METHOD FOR TREATING AMMONIA-CONTAINING EFFLUENT WATER--

Signed and Sealed this

Twenty-seventh Day of March, 2007

JON W. DUDAS
*Director of the United States Patent and Trademark Office*